US008240563B2

(12) United States Patent
Kaplan et al.

(10) Patent No.: US 8,240,563 B2
(45) Date of Patent: Aug. 14, 2012

(54) SELF CHECKOUT STANDS

(75) Inventors: Eric Kaplan, Smyrna, GA (US); Michael S. Notheis, Hoschton, GA (US); John Troeleman, Atlanta, GA (US)

(73) Assignee: Royston, LLC., Jasper, GA (US)

( * ) Notice: Subject to any disclaimer, the term of this patent is extended or adjusted under 35 U.S.C. 154(b) by 0 days.

(21) Appl. No.: 13/008,418

(22) Filed: Jan. 18, 2011

(65) Prior Publication Data

US 2011/0253778 A1 Oct. 20, 2011

Related U.S. Application Data

(60) Provisional application No. 61/295,220, filed on Jan. 15, 2010.

(51) Int. Cl.
*G06K 15/00* (2006.01)

(52) U.S. Cl. .......... 235/383; 235/375; 235/385; 186/59; 186/68

(58) Field of Classification Search .................. 235/375, 235/383, 385; 186/59, 68
See application file for complete search history.

(56) References Cited

U.S. PATENT DOCUMENTS

| | | | | |
|---|---|---|---|---|
| 3,627,108 | A * | 12/1971 | Hansen | 198/600 |
| 3,678,660 | A * | 7/1972 | Musser | 53/255 |
| 4,106,628 | A * | 8/1978 | Warkentin et al. | 209/556 |
| 5,211,263 | A * | 5/1993 | Davidson et al. | 186/61 |
| 5,706,912 | A * | 1/1998 | Holland | 186/68 |
| 5,918,728 | A * | 7/1999 | Syverson | 198/788 |
| 6,471,044 | B1 * | 10/2002 | Isaacs et al. | 198/809 |
| 2003/0052166 | A1 * | 3/2003 | Nguyen | 235/383 |
| 2005/0061634 | A1 * | 3/2005 | Dickover et al. | 198/835 |
| 2005/0178831 | A1 * | 8/2005 | Sherrod | 235/381 |
| 2008/0302607 | A1 * | 12/2008 | Kaplan et al. | 186/61 |

* cited by examiner

*Primary Examiner* — Ali Sharifzada
(74) *Attorney, Agent, or Firm* — Thomas, Kayden, Horstemeyer & Risley, LLP.

(57) ABSTRACT

A self-check-out stand has a flat belt on which items that have been scanned can be placed. This belt abuts a declining belt, with both belts preferably having abutting ends with upper corners in which a fixed non-rotating nose rod is located with the rod extending across the width of the belt, the rods hold the abutting ends tightly together with only a small crack between the belts. The check-out stand has two sets of unpowered transition rollers to turn the items at an obtuse angle to the conveyer belts. The stand has a declining set of rollers to bring the items to the proper height for the customer to bag. The accumulation area rises from front to back to slow the items being conveyed. A scanner module with a monitor and pay station can be placed at the front end of the stand.

11 Claims, 13 Drawing Sheets

SELF CHECKOUT STANDS

This application claims priority to Provisional Application Ser. No. 61/295,220 filed on Jan. 15, 2010. which is entirely incorporated by reference.

FIELD OF THE INVENTION

This invention relates to a self-checkout stand for use with a scanner module located at the front end of the checkout stand for self-checkout by a customer, including the scanning of the items, paying for the items, and bagging by the customer.

BACKGROUND OF THE INVENTION

Stores, particularly supermarkets, have experienced difficulty in obtaining, training, and keeping checkout clerks. Consequently, there is a great need for a self-checkout system. A single clerk can then monitor and assist on several checkout lanes at the same time. The present checkout stands cannot handle large orders. Some of them can only handle 8 to 10 items. The bagging area of these checkout stands is usually immediately adjacent to the scanner and is not large enough to handle a large order. They also require the customer to bag an item that has been scanned immediately, which is inconvenient to the shopper in the extra steps the shopper must take in the checkout process.

DETAILED DESCRIPTION OF THE INVENTION

Figure 1:
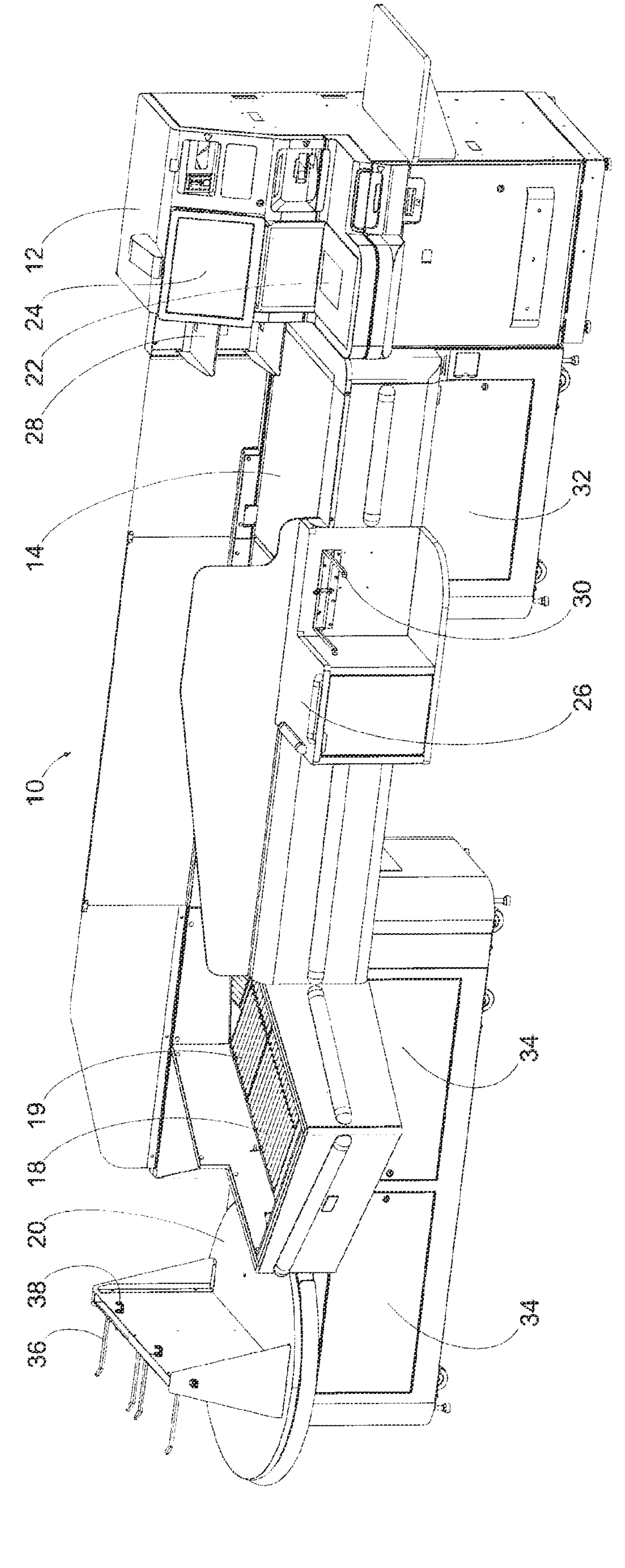
FIG. 1 is a perspective isometric view of the front side of the self-checkout stand of this invention with a scanning module.

This invention discloses a self-checkout stand for use with a scanning module. The customer first scans the items purchased at a scanning module and may pay for them at that time. The customer then places the items on a flat take-away belt. This self-checkout stand has two belts, one of which is a flat take-away belt, and the other is a declining take-away belt which is adjacent to a set of transition rollers and which in turn is adjacent to declining rollers in the bagging area. It may have a turn-table bagging section or the bagging could take place on the declining rollers or in an accumulation area.

Parts List

10—Self-checkout stand
12—Scanner module
14—First flat take-away belt
15—Declining take-away belt
16—Transition rollers extending in line with the declining takeaway belt
17—Second flat take-away belt
18—Cassette assemblies of rollers at an obtuse angle to the declining takeaway belt
19. Cassette assemblies of declining rollers parallel to the roller cassette assemblies 18
20—Turntable
22—Scanner
24—Monitor
26—Auxiliary set-aside area and bag rack
28—Receipt printer shelves
30—Bag rack for auxiliary set aside area
32—Electronics compartment
34—Storage cabinets
36—Bag rack
38—Hook for reusable bags mounted to a pocket for paper bag storage
40—Idler roller of first flat take-away belt
42—Idler roller of second flat take-away belt
44—Power roller of first flat take-away belt
46—Power roller of second flat take-away belt and declining take-away belt
48—Fixed non-rotating nose rod
50. Deceleration ramp collection area.
52—Castors
54. Undercarriage for castors
56. Right hand side of declining take-away belt
58. Left hand side of declining take-away belt.
60. Obtuse angle
62. Left hand side of cassette assemblies of declining rollers
64. Right hand side of cassette assemblies of declining rollers
66. Back of deceleration ramp collection area.
68. Front of deceleration ramp collection area.
70. End of declining take-away belt
72. End of rollers in cassette 18

Figure 2:
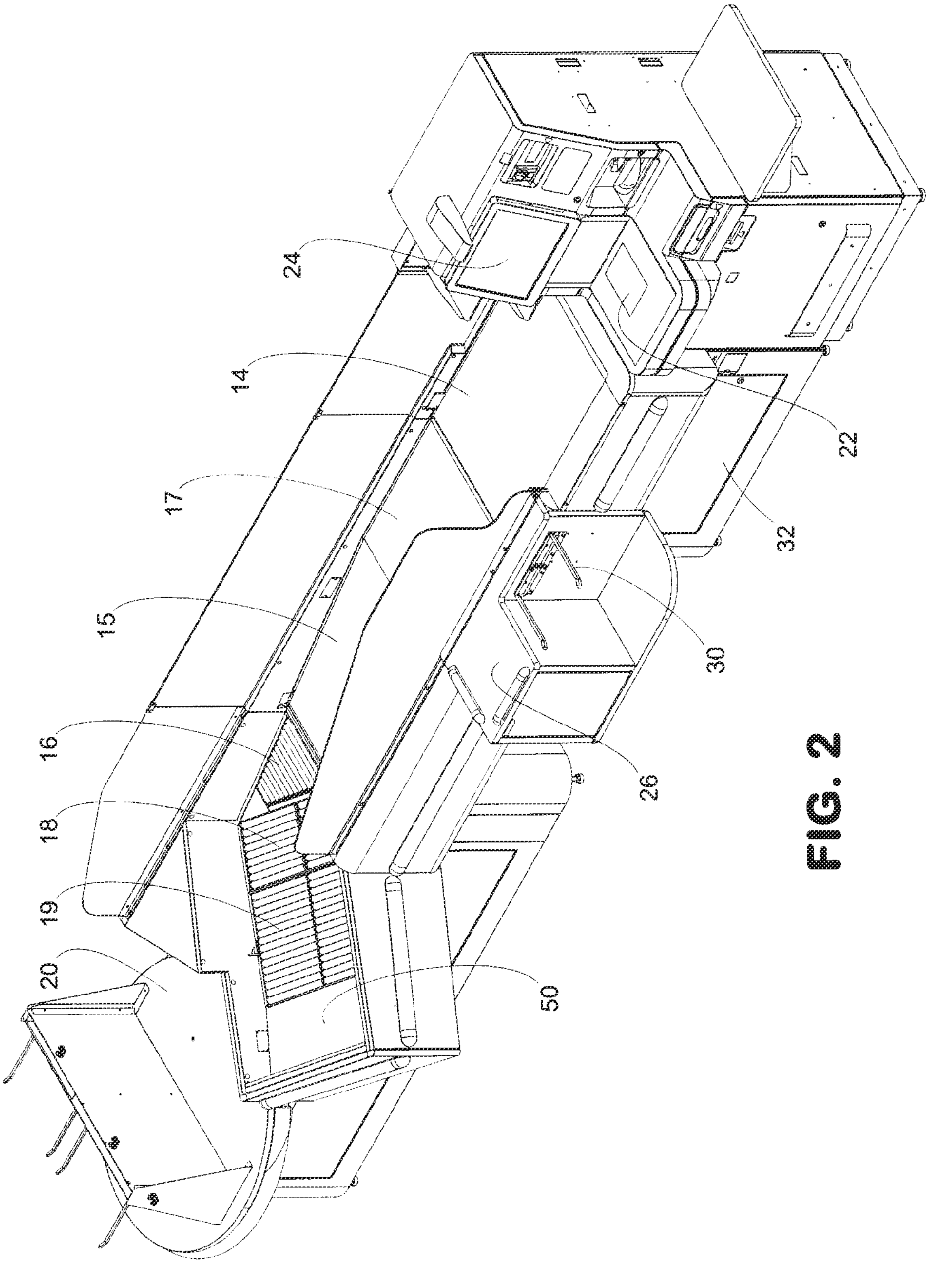
FIG. 2 is a perspective view of the front side of the self-checkout stand of FIG. 1.
Figure 3A:
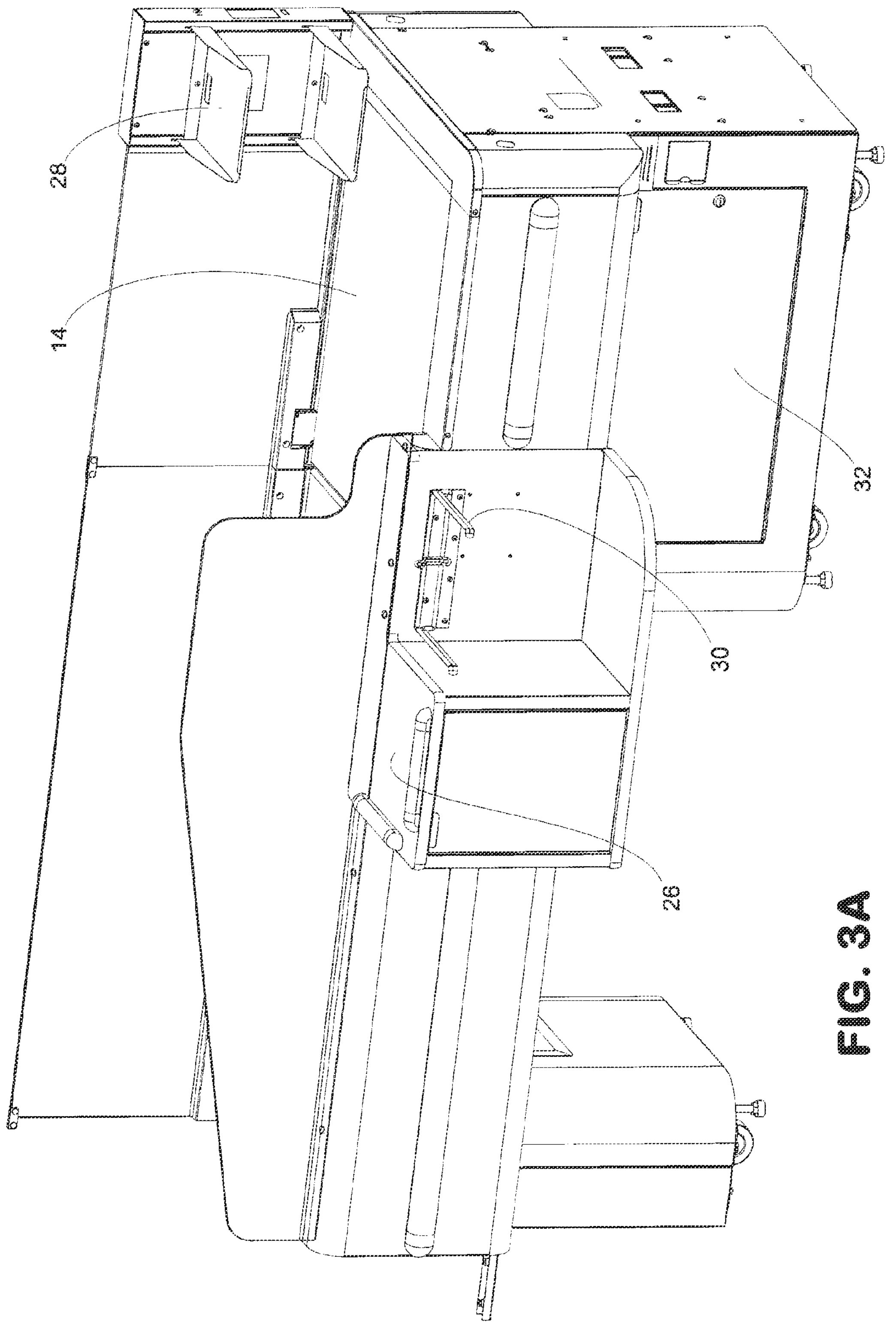
FIG. 3A is perspective view of the front side of the conveyor module of the self-checkout stand of this invention.
Figure 3B:
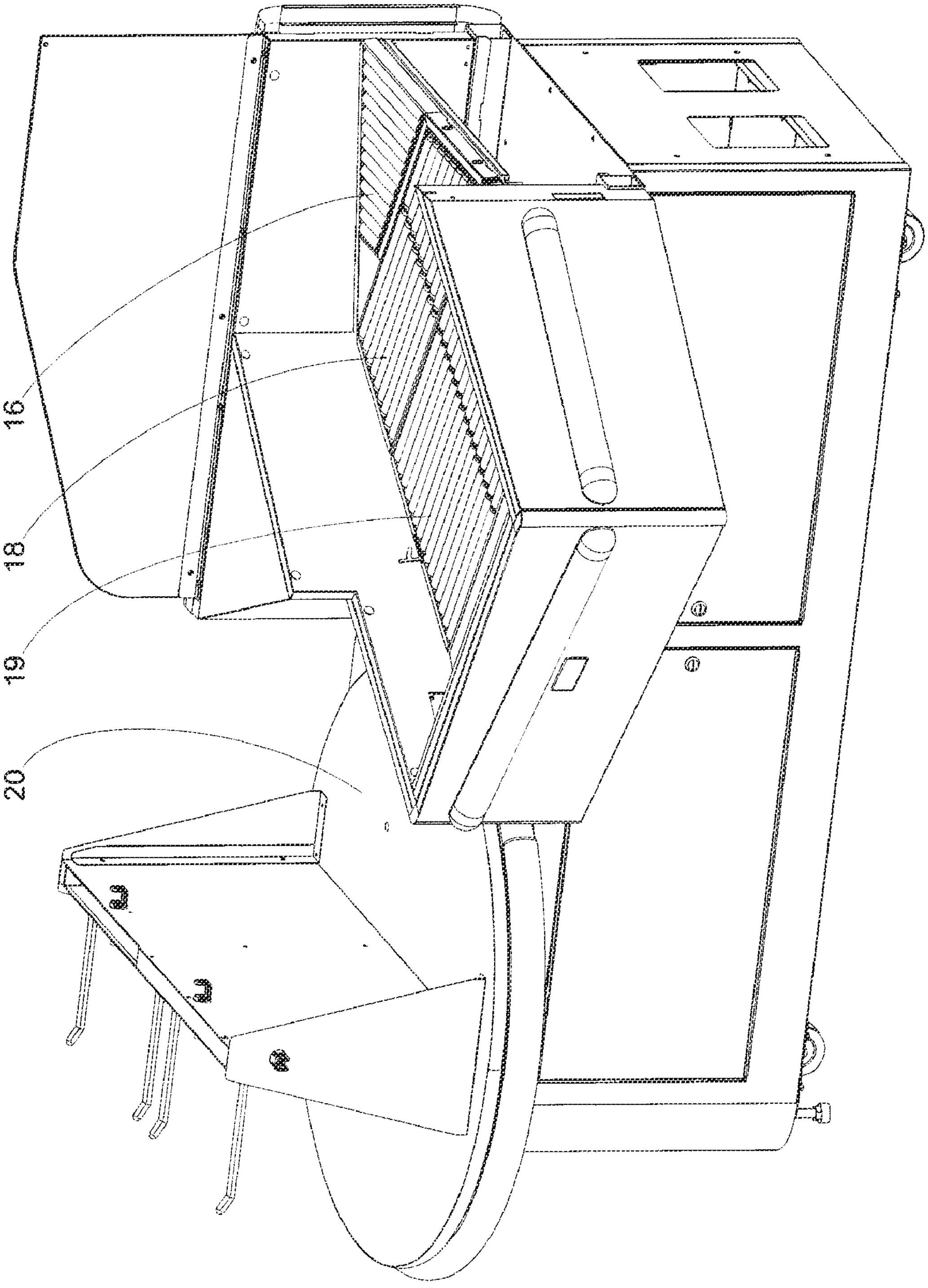
FIG. 3B is a perspective view of the front side of the collection and bagging module with a turn-table of the self-checkout stand of this invention which can be used by the shopper for bagging items purchased.
Figure 3C:
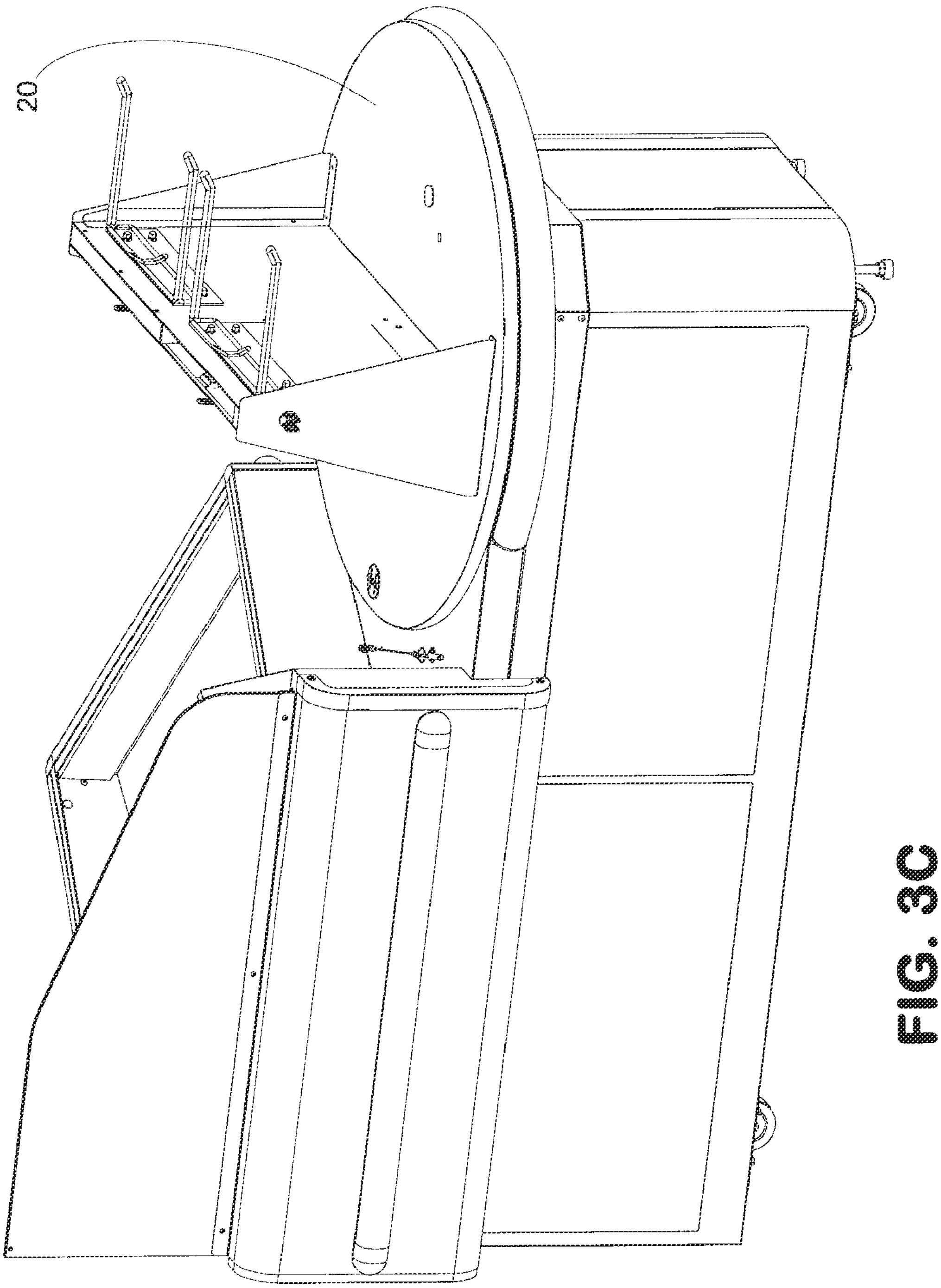
FIG. 3C is a perspective view of the back side of the self-checkout stand of the collection and bagging module with a turn-table of the self-checkout stand of this invention which can be used by the shopper for bagging items purchased.
Figure 3D:
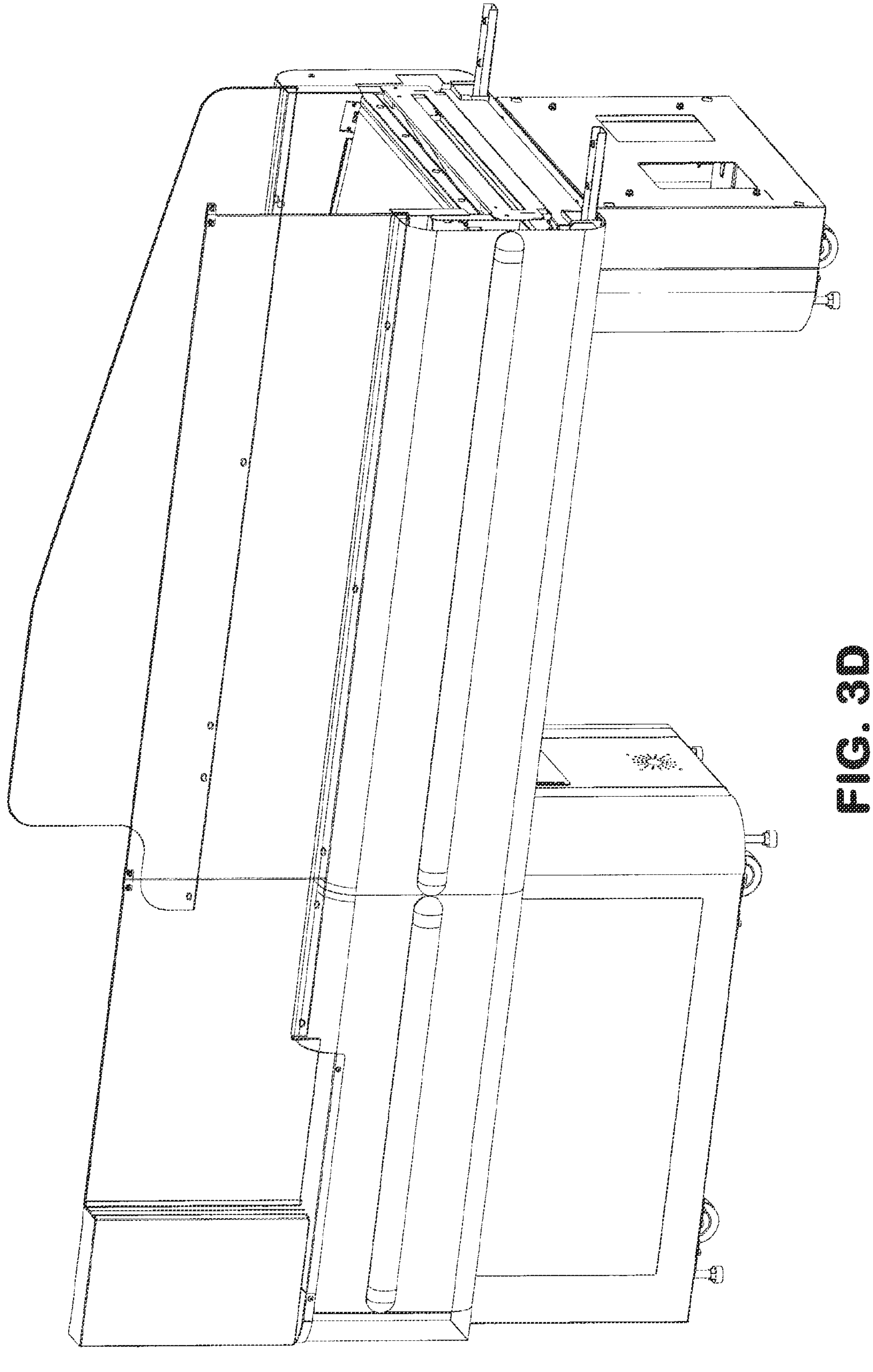
FIG. 3D is a perspective view of the back side of the conveyor module of the self-checkout stand of this invention.

This self-checkout stand 10 is for use with a scanning module, in particular the Fujitsu U-Scan Genesis. As shown in FIGS. 1 and 2, a self-checkout stand 10 is placed adjacent to the scanning module 12. In this case, the scanning module 12 is a Fujitsu Genesis U-scan. The self-checkout stand is also compatible with the Fujitsu Next Generation scanning modules. The scanning module 12 has a scanner 22 on which the customer can scan items, with the identification of the item and the price shown on the monitor 24. The item to be purchased is not put on a conveyor belt until after the customer scans the item. The scanning module 12 can also be constructed to weigh the item in order to price it. After scanning, the customer places the item on the first flat take-away belt 14 which moves the item to the second flat take-away belt 17 which moves the item towards the bagging area. These two flat take-away belts could be constructed as a single belt, but two belts are preferred.

Figure 4A:
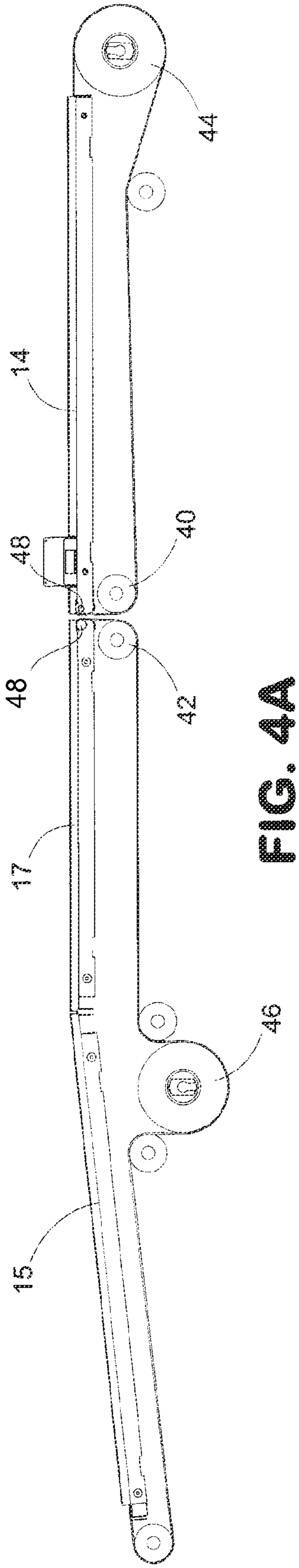
FIG. 4A is a cross-sectional side view of the belted sections of the checkout stand of this invention with the belt decks being shown.
Figure 4B:
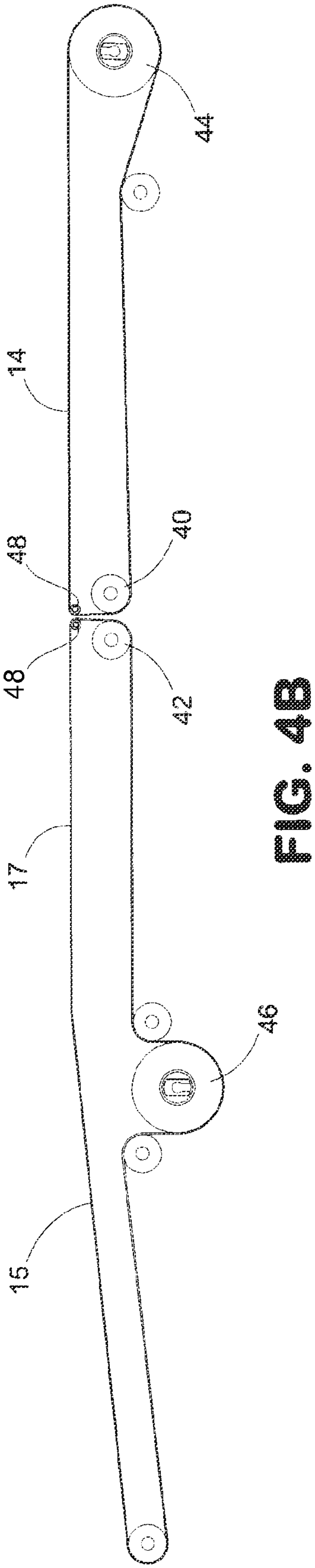
FIG. 4B is a cross-sectional view of the belted sections of the checkout stand of this invention without the belt decks being shown.

One of the problems of abutting conveyor belts is that small items on the belts frequently fall between the crack between the abutting belts. This problem has been solved in this invention by the use of small diameter fixed nose non-rotating bars 48 placed at the top corners where the belts 14, 17 abut each other as shown in FIG. 4B. This enables the crack between the abutting belts to be so small that even a dime can not fall through. This is not only important for change customers sometimes drop on conveyor belts, but also for small loose items, such as screws and cards that drop through the crack and are difficult to retrieve, even by a clerk. It has been found that a small non-rotating nose bar 48 prevents this from occurring as often happens with small idler rollers.

In order to move the items to be bagged by customers to a more convenient lower level, a declining take-away belt 15 can be used. It can be a part of the second flat take-belt as shown in FIGS. 4A and 4B, or can be a separate belt system with it is own power roller. In the case of two belts being used fixed non-rotating nose bars can be used between them at the upper abutting corners as discussed above.

As shown in FIGS. 4A and 4B, a single belt serves the function of the second flat take-away belt 17 and declining take-away belt 15. This simplifies the checkout stand 10 and allows the use of a single power roller 46 for the combination of belts 15 and 17 into a single belt. This arrangement allows the placement of this power roller 46 inside the checkout stand for safety issues. The small idler rollers 40 and 42 help keep the belts tight during operation which results in smoother processing of the items being purchased.

After finishing the scanning of all items, the customer can pay at the scanning module 12, either by cash, credit or debit card.

Figure 5:
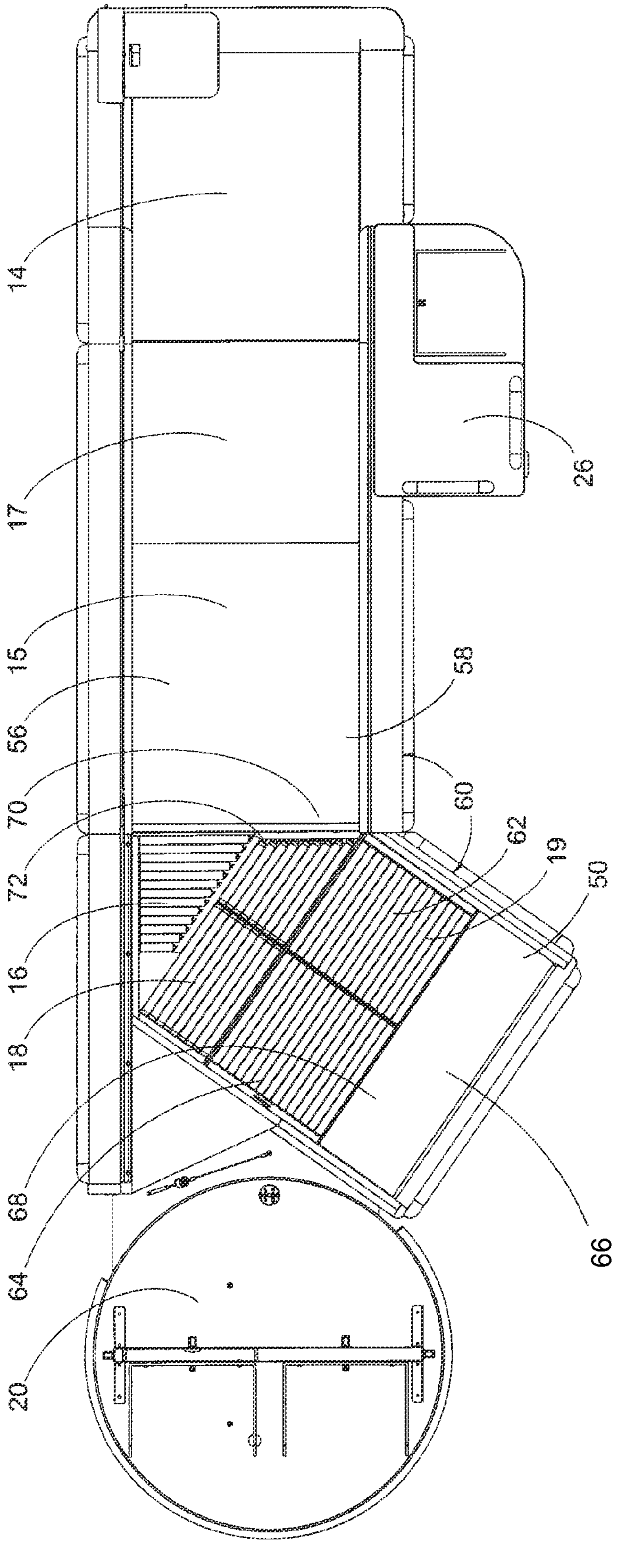
FIG. 5 is a top view of the self-checkout stand of this invention without showing the scanning module.
Figure 6:
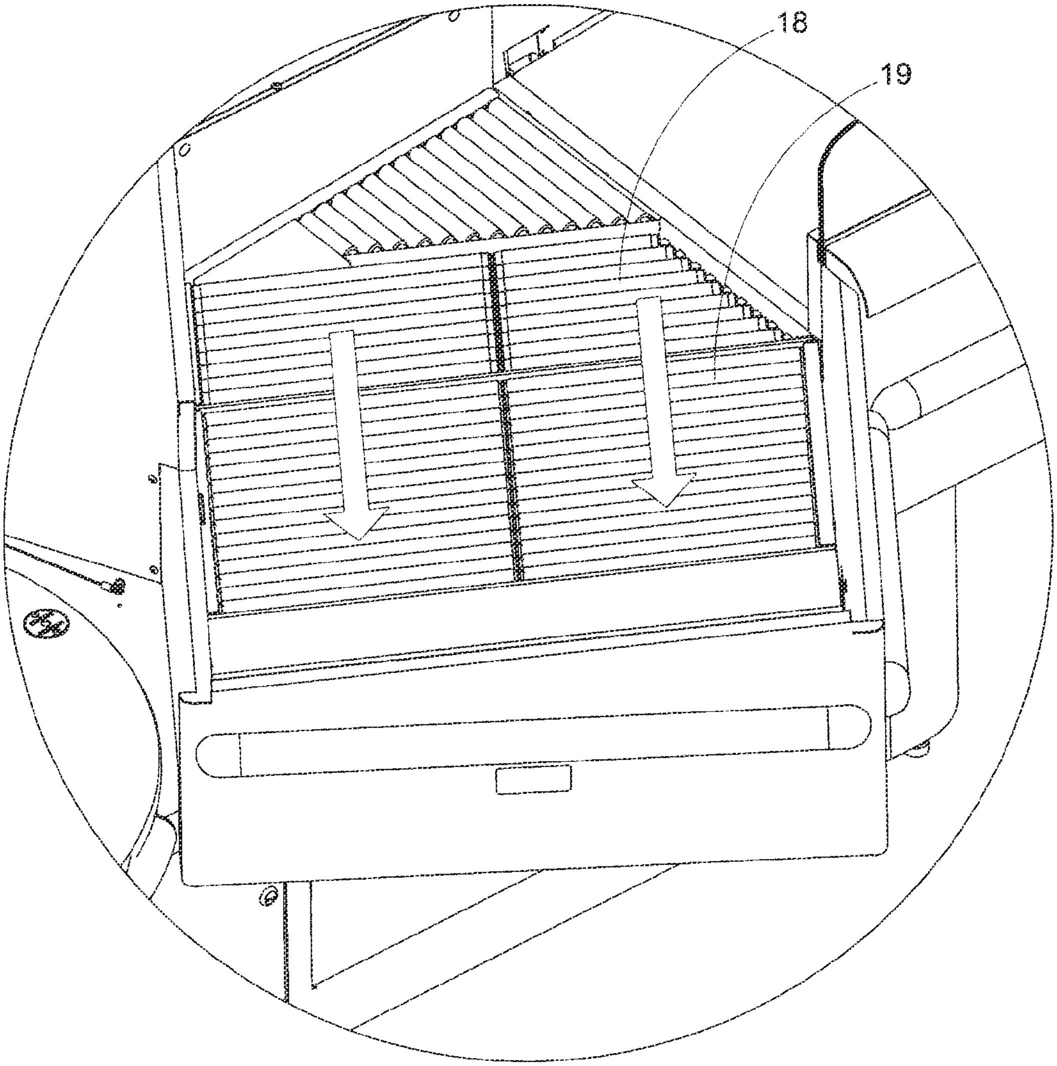
FIG. 6 is a perspective end view of the collection area of the checkout stand of this invention showing two cassette assemblies of rollers at an obtuse angle to the conveyor belts.
Figure 7:
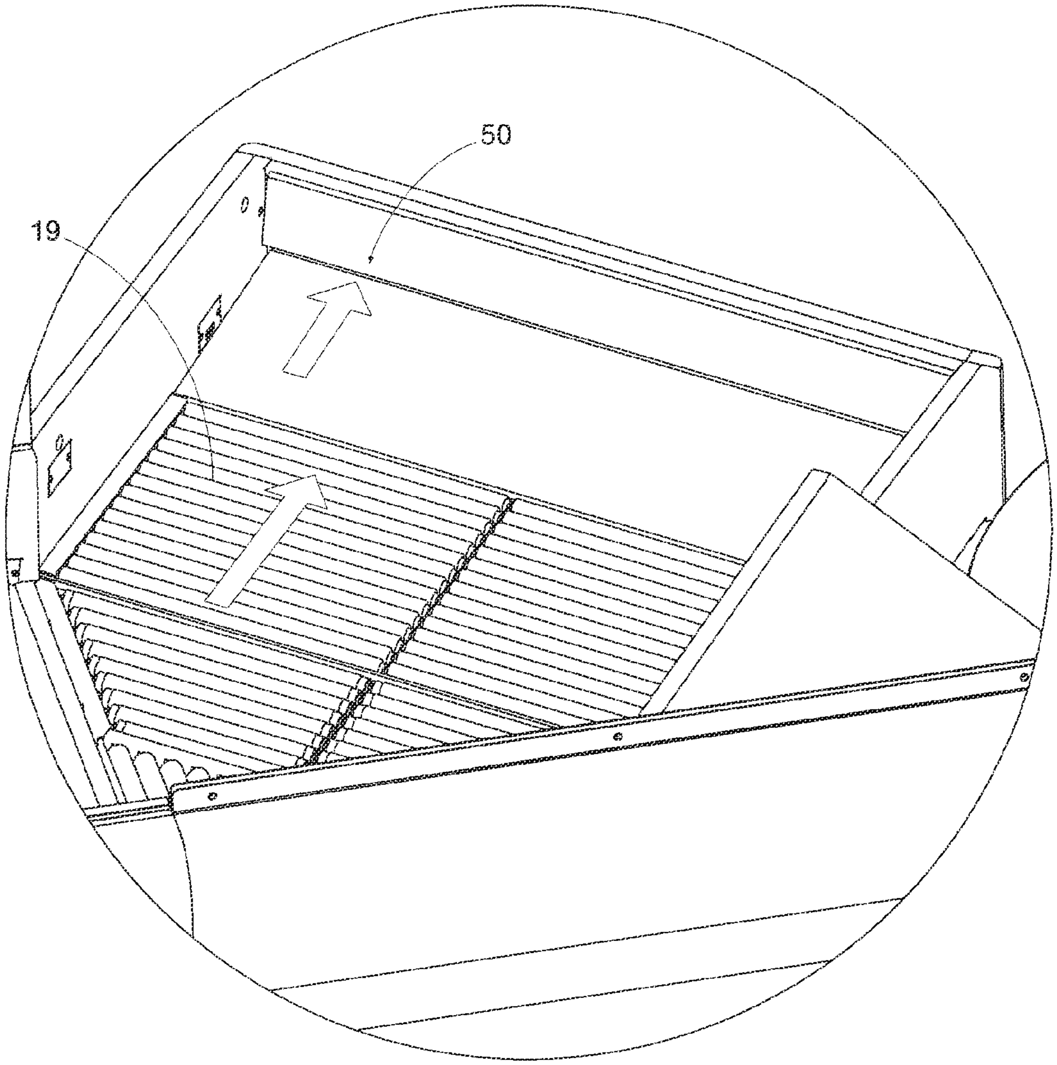
FIG. 7 is a perspective view of the cassettes of rollers leading to the deceleration ramp and collection area of the self-checkout stand of this invention.
Figure 8:
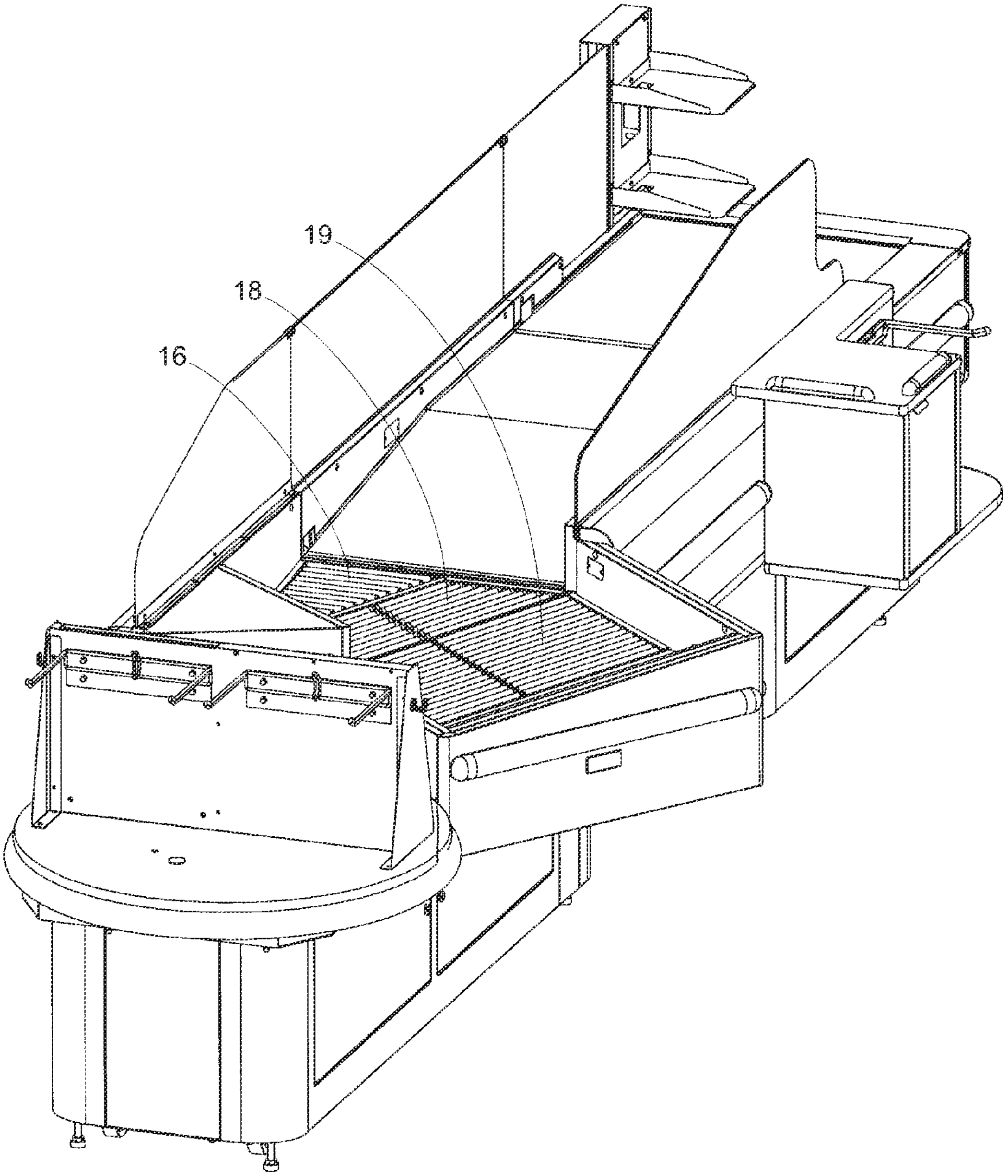
FIG. 8 is a perspective view of the end of the collection area of the self-checkout stand of this invention showing the turntable and cassettes of rollers and a section of the conveyor belts.
Figure 9:
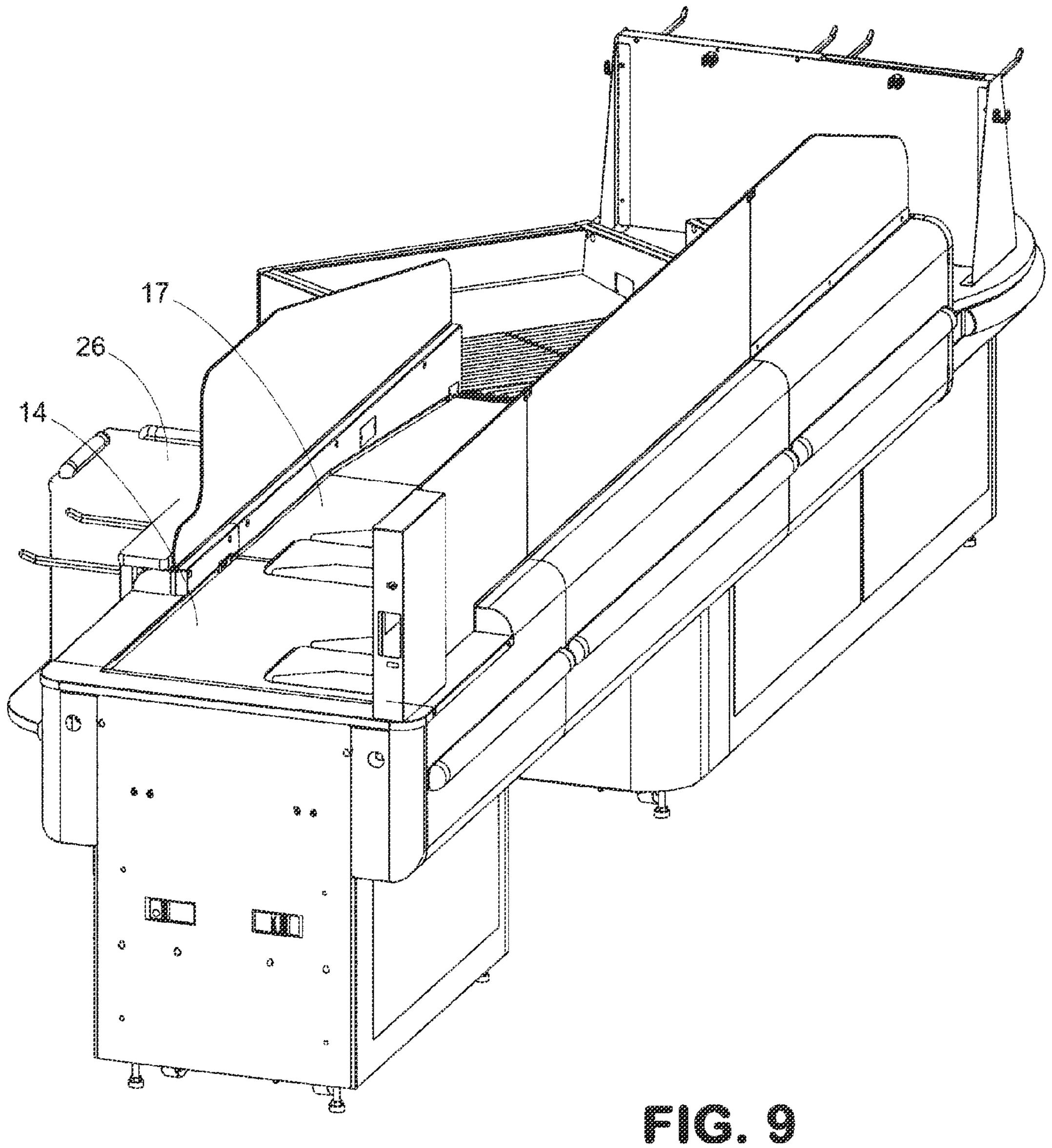
FIG. 9 is a perspective view of the front end of the self-checkout stand of this invention without the scanning module in place.
Figure 10:
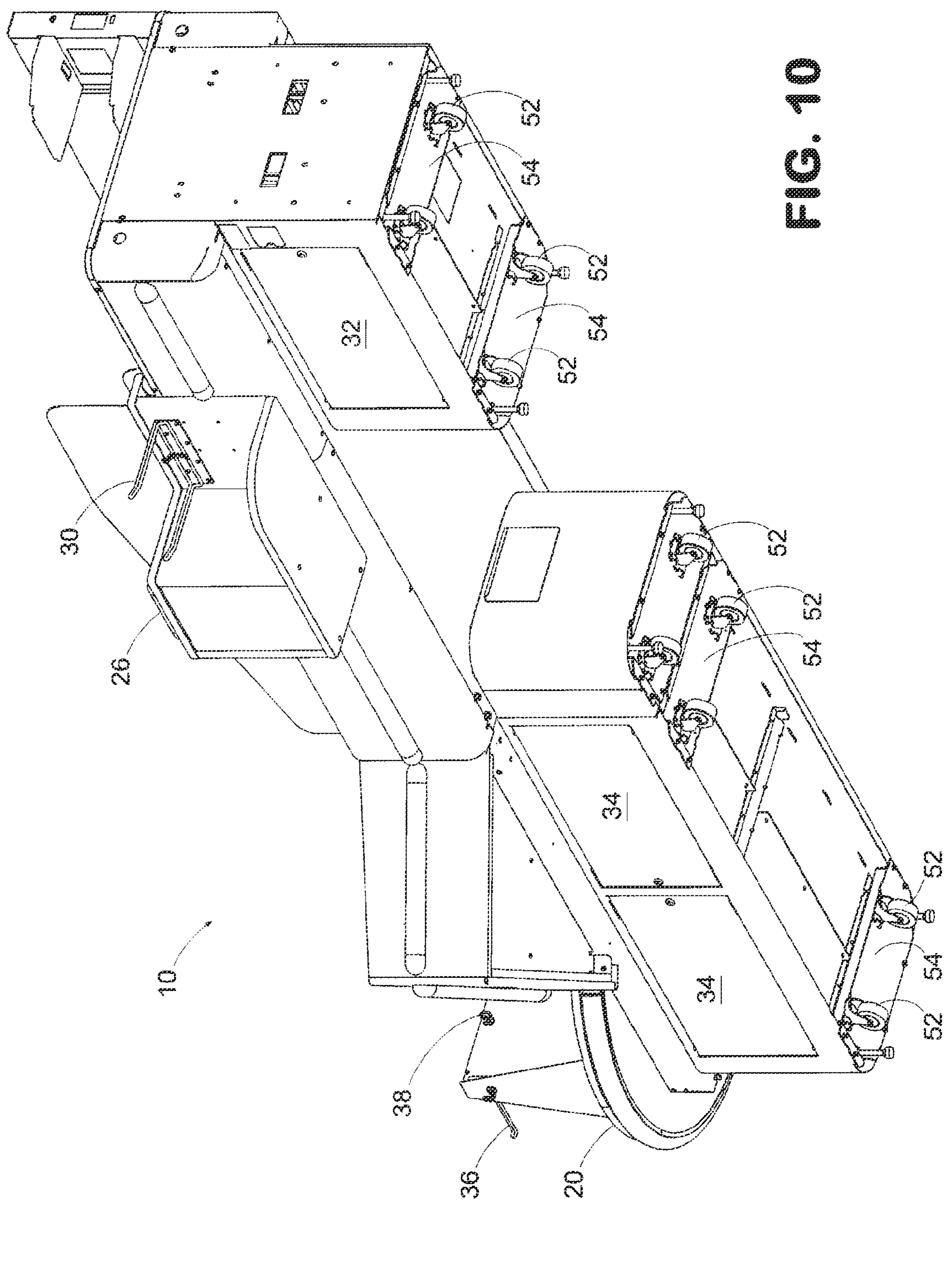
FIG. 10 is an underside perspective view of the self checkout stand of this invention showing castor wheels for moving the checkout stand.

After an item exits the declining take-away belt 15 it then turns at an obtuse angle 60 in relation to this belt to make it easier for a customer to bag his or her items. Because items placed by a customer on the first flat take-away belt 14 may end up on the right side 56 or left side 58 of the declining take-away belt 15, a mechanism is needed to insure the items make the obtuse turn and do not pile up on the declining take-away belt 15. For items on the left side 58 of the declining take-away belt 15 this is rather straight forward mechanism. These items are simply conveyed onto the non-powered cassette of rollers 18 which are obtuse to the declining take-away belt 15 at an angle such as to permit the customer easy access for placing the items on a turntable 20 or taking out of the accumulation area 50. The cassette of rollers 18 can be a single cassette or two side by side cassettes as shown in FIG. 5. The cassette on the left 62 can accept the items on the left 58 of the checkstand 10 and needs to have rollers with ends 72 that abut the end 70 of the declining belt 15 in order for items to make the transition at an obtuse angle 60. Items on the right 56 of the checkstand will not pile up on the conveyor, but rather will need to make two steps to turn. These items on the right 56 will be conveyed onto the non-powered triangular transition roller cassette 16, which is in line with the conveyor belts. These items will then make the transition to the cassette or cassettes18 which is at an obtuse angle 60 to the checkstand. This mechanism allows the items to be more evenly distributed onto deceleration ramp collection area 50. The items move down the cassette 18 to the cassette assembly or assemblies of non-powered declining rollers 19 parallel to the roller cassette assemblies 18. Cassette assembly 19 speeds the movement items into the deceleration ramp collection area 50. To prevent items from crashing into the rear of the collection area, this area increases in height from front 68 to back 66. Turning the items at an obtuse angle 60 in relation to the check stand 10 and also lowering the items from the level of the conveyor belts permits easy access by the customer in bagging the items. It is not necessary to have a turntable 20 with this checkout stand. The items could simply be taken off of the deceleration ramp collection area 50 and bagged.

This self-checkout stand can have an auxiliary set aside area 26 on which fragile or small items can be placed to prevent them being damaged or lost on the checkout lane. This self-checkout stand has receipt printer shelves 28. The auxiliary set aside area 26 may have a bag rack 30. The electronics of this unit are housed in the electronics compartment 32. This self-checkout stand 10 has storage cabinets 34. The turntable 20 has bag racks 36 and a hook 38 for reusable bags mounted on a pocket for storing paper bags.

This unit self-checkout stand with the scanning module is especially designed for self-checkout by a customer.

The declining takeaway belt 15 and the cassette assemblies of declining rollers 19 bring the items to a level and position that is convenient for the customer to do the necessary bagging. The scanning module 12 is set up so the customer can pay at this module before the groceries are bagged.

It should be realized that the checkstand without the scanning module can be used with another arrangement used for payment. These are especially true if items have RFID tags which can be recorded electronically.

We claim:

1. A self-checkout stand for customers to scan items and pay for items being purchased and placed on the stand for accumulation and movement and for the customer to bag the items without assistance comprising a frame supporting the checkout stand, the stand having a flat belt on which items can be placed by the customer, with a declining take-way belt after the flat belt, the declining take-way belt having a left side, a right side and an end, with a set of rollers on the left side at an obtuse angle to the declining take-way belt, with the set of rollers having ends that abut the end of the declining take-way belt, with a set of transition rollers having right side ends in line with the right side of the declining take-away belt, with axes of the transition rollers being parallel to a width of the declining take-away belt, the transition rollers having left side ends abutting the set of rollers at an obtuse angle to the declining take-way belt, with an abutting set of declining rollers positioned between the set of rollers and an accumulation area with a front and back such that the abutting set of declining rollers extends between a back of the set of rollers and the front of the accumulation area, with the accumulation area rising in height from the front to the back to slow a speed at which the items move along the checkout stand.

2. The self-checkout stand of claim 1 in which the flat belt and the declining take-way belt have ends abutting each other, the flat belt forming a closed loop in which a first fixed non-rotating nose rod is located at an upper corner thereof, with the first fixed non-rotating nose rod extending across the width of the flat belt and contacting an underside thereof, the declining take-way belt forming a closed loop in which a second fixed non-rotating nose rod is located at an upper corner thereof, with the second fixed non-rotating nose rod extending across the width of the declining take-way belt and contacting an underside thereof, wherein the first fixed non-rotating nose rod and the second fixed non-rotating nose rod hold the abutting ends together.

3. The self-checkout stand of claim 1 in which a turntable is located next to the accumulation area for the bagging of items.

4. The self-checkout stand of claim 1 which further comprises a scanning section for the scanning of items being purchased by customer with a monitor and means for the customer to pay by credit or debit card or cash.

5. The self-checkout stand of claim 1 further comprising an auxiliary set aside area for fragile and small items that might get damaged or lost on the belts.

6. The self-checkout stand of claim 1 in which all of the rollers are unpowered and free turning.

7. The self-checkout stand of claim 1, wherein the set of rollers is configured as a cassette of rollers.

8. A conveyer with two conveying belts with abutting ends, a first of the conveying belts forming a closed loop in which a first fixed non-rotating nose rod is located, with the first fixed non-rotating nose rod extending across the width of the first of the conveying belts to define an upper corner of the first of the conveying belts, a second of the conveying belts forming a closed loop in which a second fixed non-rotating nose rod is located, with the second fixed non-rotating rod extending across the width of the second of the conveying belts to define an upper corner of the second of the conveying belts such that the first fixed non-rotating nose and the second fixed non-rotating rod hold the upper corner of the first of the conveying belts and the upper corner of the second of the conveying belts together with only a small crack between the belts.

9. The self-checkout stand of claim 8 in which a turntable is located next to the accumulation area for the bagging of items.

10. The self-checkout stand of claim 8 which further comprises a scanning section for the scanning of items being purchased by customer with a monitor and means for the customer to pay by credit or debit card or cash.

11. The self-checkout stand of claim 8 further comprising an auxiliary set aside area for fragile and small items that might get damaged or lost on the belts.

* * * * *